April 27, 1954
W. BECKER
2,676,356
DEVICE FOR THE PRODUCTION OF TUBULAR
MEMBRANES SUCH AS SAUSAGE SKINS
Filed Sept. 19, 1950
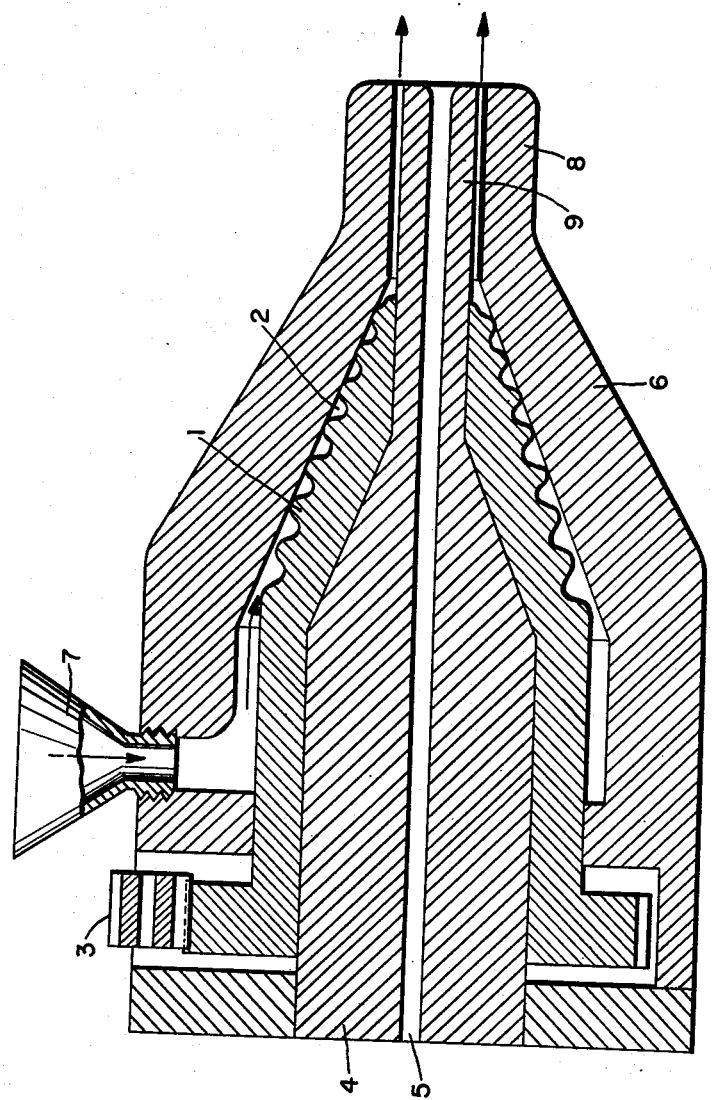
INVENTOR
WALTER BECKER
BY *Richards & Geier*
ATTORNEYS Patented Apr. 27, 1954

2,676,356

UNITED STATES PATENT OFFICE 2,676,356

DEVICE FOR THE PRODUCTION OF TUBULAR MEMBRANES SUCH AS SAUSAGE SKINS

Walter Becker, Vaduz, Liechtenstein, assignor to Anstalt Unda, Vaduz, Liechtenstein Application September 19, 1950, Serial No. 185,681

Claims priority, application Switzerland September 23, 1949

3 Claims. (Cl. 18—14)

The invention relates to a device for the production of artificial membrane bodies, for example of artificial sausage skins, by the extrusion through annular nozzles of fibre masses obtained from animal or vegetable starting materials.

The process carried out by the apparatus of invention is substantially characterized in that the fibre mass, before entering into the annular extrusion nozzle, is reorientated as a whole about an axis concentric to the axis of the nozzle, preferably under a feed pressure directed tangentially to the annular orifice, transversely to the direction of the feed, and is extruded through the annular nozzle under the said pressure.

According to the invention it has been found advantageous in this process to expose the fibre mass to a variable pressure, preferably to a pressure increasing on the way to the orifice, while being supplied and reorientated in the aforesaid manner.

In order to perform this process in practice use is made according to the invention of a device for the production of tubular bodies such as artificial sausage skins wherein, for extruding, a forming annular nozzle is used which has a stationary core, and between this nozzle body proper and the support of the core member there is a feeder element interposed which subjects a properly prepared raw material, e. g. a fibre paste of skin reduced to small pieces supplied to it e. g. through a hopper or conduit, to the aforesaid feed pressure. Such a feeder element, e. g. a helix, not only guides the mass into the nozzle but brings the fibres thereof into a tangential orientation substantially transversely to the direction of the feed before they enter into the nozzle; for example the fibres are disposed thereby on a helical line about the virtual axis.

If according to a particular embodiment a helix, which is conically tapered forward, is used in a casing which has a likewise conical cavity of corresponding dimensions, the fibre mass, which at first enters in disorder into the feed chamber, is subjected to a greater friction in a circular direction about the axis of rotation than in the direction of the discharge, and the particles caught at the entrance of this chamber by the friction of the feeder element and also by the wall friction, are accordingly orientated in a circular or tangential direction about the axis of rotation, the pressure, which increases in the forward direction owing to reduction of the cross sections, favouring this orderly disposition.

Surprisingly it has been shown that by introducing a fibre mass which already before entering into the nozzle proper has an orderly disposition of the fibres about an axis corresponding to the axis of the nozzle, a considerably simplified manner of operation and a less sensitive arrangement of the working components are made possible.

Hitherto the production of artificial sausage skins from fibre material, particularly from soaked animal fibre masses by means of annular nozzles has been effected in such a manner that the mass was introduced under comparatively very high pressures between nozzle components moving relative to one another e. g. a rotating core and a contrarotating mantle, or between a stationary core and a rotating mantle, and was passed as a rule from there through a forward nozzle section having a core and mantle stationary relative to one another. Both sections formed the shaping body of the nozzle i. e. that portion in which the tubular body was in the process of being formed.

By supplying the fibres to the rotating component of the nozzle by means of narrow tubes the fibres were at first put into an orientation parallel to one another, and then with a tangential or radial direction of supply they assumed under the action of the rotation a circular orientation directed substantially at right angles to the direction of feed, so that when friction on the walls of the stationary part separated two outer layers from one another which led to a rearrangement of these fibre layers, the aforesaid transverse orientation was achieved in the individual layers.

According to some suggestions, nozzle components should be used which have a conical shape i. e. a conical core with a conical ring which are in motion relative to one another and form a conically tapering gap. Owing to the fine annular gap into which in one type or in the other of the prior devices the as yet non-rectified fibre mass was to be introduced by pressure, the structural equipment was very involved and expensive in view of the pressure to be applied for passing the mass through narrow tubes, and was very sensitive to clogging and similar disturbances. In the first place, such nozzles did not operate free from vibrations owing to the presence of components which were journalled in rotating parts, particularly when the stationary inner core used for the rearranging of the fibres had to be guided in the rotating mantle over considerable operative lengths. Owing to the mutual oscillations which then occurred under the action of the mass to be rearranged, variations in the wall thickness of the membranes formed occurred. In consequence there were thin spots in the tubular bodies formed, or the necessity not to go below substantial wall thicknesses for safety reasons.

These difficulties were obviously the greater the smaller were the diameters of the tubular bodies and the finer were the wall thicknesses aimed at. Primarily the life period of such nozzles with components operating with rotation within the nozzles proper was very low owing to the high pressure of operation.

The present invention has accordingly the task of obviating the involved measures described, i. e. an inavoidable pretreatment of the material which inter alia led to a weakening of the fibres owing to the swelling of the material which was partly driven very far, and also of obviating the disturbances in operation owing to a journalling of the working components, which was not free from vibrations in order to produce artificial guts and membranes suitable for other purposes which in appearance and properties come nearer to natural membranes e. g. guts, and primarily are capable of being produced even with very fine wall thicknesses.

The device suitable for performing this process consists, as stated, in its basic construction of a stationary nozzle i. e. of a core—having the usual axial air supply channel in it said core being rigidly connected to the mantle, and the journalling for the rotary component being arranged within the mantle, between the nozzle component proper and the housing of the stationary part in the mantle. This rotary component may have e. g. the shape of a cylinder which tapers off conically in the forward direction, or the shape of a cone, which is journalled behind the core of the nozzle on the shaft of the core, which latter may be reinforced, if desired, and provided with a central bore; it operates within the mantle body of the nozzle which behind the nozzle portion is formed in accordance with the outer profile of said rotary component. In order to promote the orientating action of the rotary component, the latter may be provided on its surface with raised concentric rings or alternatively with screw threads i. e. it may be designed as a helix.

The drawing illustrates diagrammatically an embodiment of such an arrangement according to the invention, viz. in a vertical longitudinal section through the device.

In detail, 1 denotes the rotary component in the shape of a cylinder tapering off conically in the forward directions and having rings 2. This rotary component is set into rotation by driving means known per se, e. g. the pinion 3 of a gearing meshing with a toothed flange on the cylindrical end. The rotary component is journalled on the hollow shaft portion of the mandrel 4 having a central bore 5 which mandrel is in turn stationarily arranged within the mantle 6. The mould accordingly forms a statically determined rigid body so that the forward part of said mandrel which lies in the orifice 8 of the mantle 6 forms the core 9 of the nozzle. The journalling for the rotary component 1 accordingly lies between the housing of the stationary component and the nozzle proper 8 with a stationary core 9.

When carrying out the process, the mass is supplied in a continuous operation through the diagrammatically indicated supply opening 7, is caught by the cone and, owing to the conical restriction it is fed into the nozzle with an increasing pressure, after the mass has undergone, in the conical working chamber between the mantle and the conical section of the rotary component, a reorientation about the axis of the bore. By blowing in air under pressure through the axial bore 5, collapsing of the tube formed is prevented until the mass is capable of maintaining per se the shape imparted on it.

The arrangement illustrated allows obviously of various modifications within the scope of the invention for example particularly in relation to the construction of the rotary component. The latter can, as stated, be constructed in the manner of a helix in order to achieve a simultaneous axial displacement and thorough mixing of the mass whereby in an appropriately prepared mass a feed action is set up at the same time in the longitudinal and in the transverse direction. If desired, the outer mantle of the casing can be set into rotation i. e. so as to move about a smooth cone, about a helically threaded cone or about an appropriately formed stationary or rotary component, and finally the mantle itself can be provided with helical threads. The helix proper can be divided, if desired, in the longitudinal direction into several separate helices of different pitch, conveniently in such a manner that the feed pressure increases when approaching the orifice and the stationary core in the latter.

The rotary component per se can have cylindrical shape if desired. The helical shape, however, is particularly convenient for arrangements for the production of small gut profiles, e. g. of string guts, since thereby the stability and safety of the housing of the stationarily attached core is increased. Finally the orifice that surrounds the core may be made rotatable, and besides, the orifice may have the most various shapes of gap profiles.

In the application in practice it has been found that under circumstances a far reaching soaking of the mass as was considered necessary hitherto partly in consideration of the construction of the operative components of the device, can now be dispensed with, although of course such masses, too, can be treated with advantage in this device, since the supply does not require the application of high pressures and the use of thin tube lines. It is also possible to use masses which are blended with substances having the function of a cementing agent or of a lubricant.

It will be understood that I do not desire to be limited to the exact details of the apparatus described, for obvious modifications will occur to a person skilled in the art.

What I claim as my invention and desire to secure by Letters Patent, is:

1. A device for extruding a fibrous mass into tubular artificial membrane bodies, said device comprising a hollow mantle having a conical end portion and a cylindrical nozzle constituting a continuation of said conical end portion, a mandrel centrally located within said mantle and having a central bore formed therein, said mandrel having a conical end portion of the same taper as the conical end portion of said mantle and extending parallel thereto, said mandrel further having a cylindrical portion located within said nozzle spaced therefrom to define an annular gap within said nozzle, a rotary member mounted upon said mandrel between said mandrel and said mantle and having a conical portion located upon the conical portion of the mandrel and extending to said nozzle, feeder projections upon said conical portion of the rotary member, and a drive engaging said member for rotating the same.

2. A device according to claim 1, wherein said projections consist of concentrical rings.

3. A device according to claim 1, wherein said projections constitute helical windings.

References Cited in the file of this patent

UNITED STATES PATENTS

| Number | Name | Date |
| --- | --- | --- |
| 454,030 | Clark | June 16, 1891 |
| 1,374,584 | Knecht | Apr. 12, 1921 |
| 2,161,908 | Becker | June 13, 1939 |
| 2,333,786 | Hessen | Nov. 9, 1943 |
| 2,365,374 | Bailey | Dec. 19, 1944 |
| 2,382,504 | Schultz | Aug. 14, 1945 |